G. McGLUMPHY.
NUT LOCK.
APPLICATION FILED AUG. 25, 1915.
1,175,785.
Patented Mar. 14, 1916.
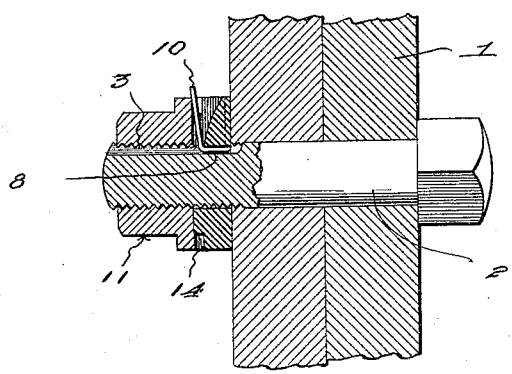
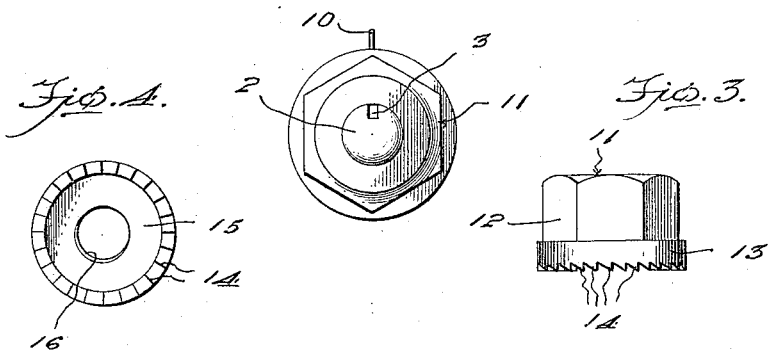
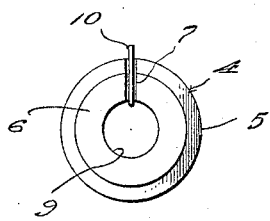
Inventor
G. McGlumphy

UNITED STATES PATENT OFFICE.

GEORGE McGLUMPHY, OF SAN FRANCISCO, CALIFORNIA, ASSIGNOR OF ONE-HALF TO CHARLES W. AGEE, OF SAN FRANCISCO, CALIFORNIA.

NUT-LOCK.

1,175,785.  Specification of Letters Patent.  Patented Mar. 14, 1916.

Application filed August 25, 1915. Serial No. 47,369.

*To all whom it may concern:*

Be it known that I, GEORGE MCGLUMPHY, a citizen of the United States, residing at San Francisco, in the county of San Francisco and State of California, have invented certain new and useful Improvements in Nut-Locks; and I do hereby declare the following to be a full, clear, and exact description of the invention, such as will enable others skilled in the art to which it appertains to make and use the same.

This invention relates to new and useful improvements in nut locks and the principal object of the invention is to provide a nut lock which will effectively hold the nut from backing off of bolts and will permit the same to be easily and quickly removed.

Another object of the invention is to provide a novel nut lock in which the locking tongue for the nut also acts as a tongue to prevent the locking washer from turning around the bolt.

A further object of the invention is to provide a device comprising a bolt having a groove on which a washer is provided with a locking tongue, one end of which is extended to engage in the groove in the shank of the bolt and a nut, the under face of which is provided with an annular series of ratchet teeth.

With these and other objects in view, the invention consists in the novel combination and arrangement of parts which will be fully set forth in the following specification and accompanying drawings, in which:—

Figure 1 is a view illustrating this improved nut lock as it would appear in use, the said figure being in section, to more clearly illustrate the details of construction, Fig. 2 is an end view of the assembled nut and bolt. Fig. 3 is a side view in elevation of the nut, Fig. 4 is a bottom plan view of the nut, and Fig. 5 is a top plan view of the washer.

Referring now to the drawings by characters of reference, the numeral 1 designates the work which is to be secured by means of the nut and bolt, the latter being designated by the numeral 2. The shank of the bolt is provided with a longitudinal groove 3, which extends throughout the entire length of the threaded portion and is designed to receive the locking tongue of the washer which will be more fully hereinafter described.

The washer previously referred to is designated generally by the numeral 4 and comprises the shank of the body 5, with the reduced extension 6 formed at one end. The extension and body are each formed with a slot 7 and the under side of the body is provided with a diagonal slot in which the lower end of the locking spring is secured. This locking spring is formed of a single piece of wire bent in the form of a U, the bight portion 8 of which lies within the opening 9 formed in a circular body 5 of the washer 4 and the enlargement 6. This opening 9 is formed concentric with the washer and is of a size sufficient to receive the shank of the bolt 2 previously referred to. The free end 10 of the locking springs extends upwardly as illustrated in Fig. 1 to a point beyond the upper surface of the body 5 to provide a pawl for engagement with the teeth of the flange on the nut, which will be more fully hereinafter described.

The nut above referred to is designated generally by the numeral 11 and comprises a body 12, which may be hexagonal, rectangular or in any other suitable nut form and formed at one end of this body is the flange 13, which extends outwardly from the body 12 and is formed at its under face with an annular series of ratchet teeth 14, arranged to form a concentric chamber 15 for the reception of the extension 6, hereinbefore described. This nut 11 is provided with an internally screw threaded axial bore 16, the threads of which coöperate with the threads of the shank of the bolt as clearly shown in Fig. 1.

It will be apparent from the foregoing that in use the bolt 2 is first slipped in place with relation to the work 1 and the washer 4 is then slipped over the end of the bolt so that the bight portion 8 of the locking frame engages in the groove 3 in the shank of the bolt 2. In this way it will be seen that the washer will be held against rotation but will be free to move up against the outer face of the work 1. The nut is then threaded in place and it will be apparent that upon tightening the same, the ratchet teeth 14 will engage the end 10 of the spring and will hold the nut against accidental removal. Should it be desired to remove the nut however, it is apparent that by pressing inwardly on the spring 10, the same may be moved to disengagement with relation to the teeth 14 and thus leave the nut free to be rotated to release the same from position on the bolt.

While in the foregoing there has been shown and described the preferred embodiment of this invention, it is to be understood that such changes may be made in the combination and arrangement of parts as will fall within the spirit and scope of the appended claim.

What is claimed is:

The combination with a bolt having a slotted shank, of a washer having a radial groove, a spring tongue within the groove, an angular extension on the spring tongue forming a tongue on the washer to seat in the groove in the bolt, a nut, an annular series of ratchet teeth on the under face of the nut to engage the spring tongue and hold the nut against accidental removal.

In testimony whereof I affix my signature in presence of two witnesses.

GEORGE McGLUMPHY.

Witnesses:
 JOHN STULL,
 CHESTER WILLIAMSON.

Copies of this patent may be obtained for five cents each, by addressing the "Commissioner of Patents, Washington, D. C."